United States Patent
Gschwendtner

(10) Patent No.: US 9,706,696 B2
(45) Date of Patent: Jul. 18, 2017

(54) VEHICLE CONTROL SYSTEM

(71) Applicant: AGCO INTERNATIONAL GmbH, Hesston, KS (US)

(72) Inventor: Christian Gschwendtner, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 112 days.

(21) Appl. No.: 14/581,041

(22) Filed: Dec. 23, 2014

(65) Prior Publication Data

US 2015/0201547 A1    Jul. 23, 2015

(30) Foreign Application Priority Data

Dec. 23, 2013    (GB) .................................. 1322859.8

(51) Int. Cl.
| | | |
|---|---|---|
| *A01B 63/112* | (2006.01) | |
| *F16H 61/425* | (2010.01) | |
| *F16H 61/435* | (2010.01) | |
| *F16H 47/04* | (2006.01) | |
| *A01B 63/10* | (2006.01) | |
| *A01B 63/22* | (2006.01) | |
| *F16H 61/4043* | (2010.01) | |
| *F16H 61/47* | (2010.01) | |

(52) U.S. Cl.
CPC ........ *A01B 63/112* (2013.01); *A01B 63/1006* (2013.01); *A01B 63/22* (2013.01); *F16H 47/04* (2013.01); *F16H 61/4043* (2013.01); *F16H 61/425* (2013.01); *F16H 61/435* (2013.01); *F16H 61/47* (2013.01)

(58) Field of Classification Search
USPC ....................................... 172/7, 8, 10; 701/50
IPC ........................... A01B 63/10,63/1006, 63/112
See application file for complete search history.

(56) References Cited

U.S. PATENT DOCUMENTS

| | | | | |
|---|---|---|---|---|
| 3,575,241 A | * | 4/1971 | McKeon | ................ A01B 67/00 |
| | | | | 172/3 |
| 3,834,738 A | * | 9/1974 | Koch | .................... A01B 63/112 |
| | | | | 172/7 |
| 4,023,622 A | | 5/1977 | Gregerson | |
| 4,031,964 A | * | 6/1977 | Takahashi | ................ E02F 5/32 |
| | | | | 172/12 |

(Continued)

FOREIGN PATENT DOCUMENTS

| | | |
|---|---|---|
| EP | 2546627 A2 | 1/2013 |
| WO | 2013/053645 A1 | 4/2013 |

OTHER PUBLICATIONS

Intellectual Property Office, Search Report dated Aug. 5, 2014 for UK Application No. GB1322859.8.

(Continued)

*Primary Examiner* — Gary Hartmann

(57) ABSTRACT

A control system for a tractor that controls an operating condition of an attached implement and includes a pressure sensing device which senses the pressure in the hydraulic drive circuit and provides a signal indicative of the pull force necessary to pull the implement. The control system further includes a control device which receives the pressure signal and a second signal relating to the speed of the tractor and adjusts the position of the implement to a position within a pre-determined range in order to prevent damage to the tractor or implement.

5 Claims, 4 Drawing Sheets

(56) References Cited

U.S. PATENT DOCUMENTS

| | | | | |
|---|---|---|---|---|
| 4,085,806 A * | 4/1978 | Osujyo | A01B 63/112 | 172/7 |
| 4,173,259 A * | 11/1979 | Heckenkamp | A01B 63/112 | 172/10 |
| 4,438,818 A * | 3/1984 | Treichel | A01B 63/112 | 172/9 |
| 4,454,919 A * | 6/1984 | Arnold | A01B 63/1117 | 172/1 |
| 4,503,916 A * | 3/1985 | Wiegardt | A01B 63/1117 | 172/3 |
| 4,518,044 A * | 5/1985 | Wiegardt | A01B 63/1117 | 172/3 |
| 4,807,136 A * | 2/1989 | Rutkowski | A01B 63/112 | 172/7 |
| 4,846,283 A * | 7/1989 | Batcheller | E02F 9/2029 | 172/10 |
| 5,684,691 A * | 11/1997 | Orbach | A01B 63/112 | 172/2 |
| 5,884,204 A * | 3/1999 | Orbach | A01B 63/1117 | 172/2 |
| 6,105,679 A * | 8/2000 | Schubert | A01B 63/00 | 172/4 |
| 7,721,813 B2 * | 5/2010 | Hou | A01B 63/112 | 172/239 |
| 7,725,234 B2 * | 5/2010 | Shull | A01B 63/1117 | 172/2 |
| 9,078,391 B2 * | 7/2015 | Pichlmaier | A01B 63/112 | |
| 9,095,089 B2 * | 8/2015 | Pichlmaier | A01B 63/1145 | |
| 2006/0016609 A1 * | 1/2006 | Chauvel | A01B 63/111 | 172/7 |
| 2008/0257570 A1 * | 10/2008 | Keplinger | A01B 63/145 | 172/9 |
| 2012/0143392 A1 * | 6/2012 | Lurie | B64C 13/04 | 701/1 |
| 2012/0185137 A1 | 7/2012 | Schedgick et al. | | |
| 2016/0029542 A1 * | 2/2016 | Gschwendtner | A01B 63/10 | 701/50 |
| 2016/0029543 A1 * | 2/2016 | Stich | A01B 59/043 | 701/50 |
| 2016/0039480 A1 * | 2/2016 | Pichlmaier | G07C 5/085 | 701/29.1 |

OTHER PUBLICATIONS

European Patent Office, International Search Report for related EP Application No. 14196843.8, mail date Jun. 3, 2015.

\* cited by examiner

VEHICLE CONTROL SYSTEM

BACKGROUND OF THE INVENTION

Field of Invention

The invention relates to a control system of a vehicle, especially a tractor, equipped with a Continuously Variable Transmission (CVT) of the hydrostatic-mechanical split type which includes a hydraulic drive circuit in which a hydraulic pump supplies pressurised fluid to a hydraulic motor.

Description of Related Art

A hitch, such as a three-point linkage is one known arrangement used to attach implements to a drawing vehicle, for example an agricultural tractor. The implement may be fully mounted or semi-mounted on the tractor whereby a semi-mounted implement has a wheel engaging with the ground during soil operation while a fully-mounted implement puts all its load on the three-point linkage.

Three point linkages most frequently consist of two lower lifting arms to which an implement is attached. The lower lifting arms can be pivoted by respective hydraulic actuating cylinders to adjust the height position of the implement relative to the tractor. Furthermore, these lower lifting arms may be manually adjusted by length to be appropriate for an implement to be attached. An additional top link connects the implement to the tractor above the lower lifting arms. This top link is used to pivot the implement about a horizontal transverse axis and is adjustable by means of a threaded connection, or a hydraulic cylinder.

Alternative designs of three-point linkages are known, such as the arrangements shown in U.S. Pat. No. 6,321,851, US 2003/217852 and U.S. Pat. No. 5,997,024 in which the lower links are replaced by two or four variable length hydraulic rams. This variable length ram arrangement enables multi axis movement of any implement attached to the linkage.

To control the three-point linkage, modern tractors are mainly equipped with electronic linkage control systems to improve work quality and operator comfort during operation.

Such electronic linkage control systems operate in three well known modes:

Position Control: In general, the tractor speed is kept constant by a speed control system and the position of the lower lifting arms is sensed directly or indirectly so that the working depth of the implement in the soil can be adjusted whilst the speed of the tractor is kept constant.

Draft Control: The implement is raised and lowered in the soil depending on the draft force applied by the implement to reduce fuel consumption, avoid engine stall or avoid damage of the implement or tractor. Again, vehicle speed is kept constant. If the implement is lowered into the ground an initial draft is applied defining a zero level. The operator can then set a value representing a force increase which means that the operator can decide how fast the implement is lifted when a small force increase or a large force increase occurs. The value of the force entered by the operator does not represent an exact value of the force applied, e.g. 5 kN, but defines the responsiveness of the draft control. The objective of this function is to move the implement while avoiding excessive draft or pull force variations. Therefore, a draft force sensor, typically in the form of a draft force sensing pin which connects the lower lifting arms to the tractor chassis is used to measure the horizontal load applied to the tractor by the implement.

Intermix of Position/Draft Control: This control arrangement, as its name implies, is a mixture of position and draft control in which a draft control system can only lift the implement within a limited range of positions. This function is provided to avoid excessive movement of the implement in the soil resulting in poor working quality. Again, vehicle speed is kept constant by a speed control system.

Only the draft control and intermix mode (both referred to as drag modes) operate under measurement of the drag force. Generally, deactivating the drag modes results in that the system enters the position mode with no drag force influencing the lifting heights. It may however be difficult to install a draft force sensing pin due to the complex three-dimensional geometry of a linkage. Further, the sensing pins may become dirty or damaged and thus may not function properly. Accordingly, a control system which does not rely on sensing pins is preferred.

A linkage control based on CVT parameters can result in that the control system moves the position of the linkage over a wide vertical displacement range as a reaction to the drag force. Various situations have been identified in which the movement of the linkage should be limited in drag mode, since otherwise the draft control will cause the implement to crash to the ground, or cause the linkage to collide with the wheels of the tractor, or the drawbar of an trailer.

For example, if the draft force rises continuously because a plough in the ground has hit a rock, the draft control will move the linkage up until the highest end position is reached. Other situations have been identified where an increasing, or decreasing draft force will cause vertical displacement of the linkage and any attached implement to the lowest or highest position. Detecting these situations can be quite difficult. Some implements are simply towed by attachment to a ball hitch rather than being mounted to the linkage, with actuators on the implement controlling operating conditions of the implement based on information received from the tractor, for example via a CAN-BUS link, or ISOBUS.

In the case where an implement is attached to a ball hitch on the tractor, or a when a tow bar is attached to the tractor, that is, the linkage is not used, a drag force determined by the CVT would deliver a significant change of drag signal when the roll of the tractor changes, or the vehicle travels uphill, or downhill or during acceleration. Under normal circumstances, this would cause the linkage to move, and thus when a tow bar is attached would cause it, or the linkage to collide with the tow bar.

In the case where an implement is being transported in a lifted position, the operator is ordinarily responsible for deactivating the draft or intermix mode manually when travelling along a road with an implement held in a lifted position. If this is not done the drag force determined by the CVT delivers a significant change of drag signal when the roll of the tractor changes, or the vehicle travels uphill, or downhill or during acceleration. This could result in the implement to be lowered and crashing to the ground.

In the case where an implement is attached which is not in contact with the ground during operation, for example fertiliser spreaders and sprayers, the CVT delivers a significant change of drag signal when the roll of the tractor changes, or the vehicle travels uphill, or downhill or during acceleration. This would ordinarily result in the implement being highered which is not intended, or lowered which is also not intended and may be dangerous if not expected.

In the case of acceleration to a new speed regardless of the position of the implement, the change of drag signal may result in unintentional movement of the linkage. The faster the vehicle is going, the greater is the risk of damage through unintentional movement of the linkage.

OVERVIEW OF THE INVENTION

It is an aim of the invention to provide a safer draft control function on a tractor which limits the movement of the linkage as a result of a change in draft signal. It is a further object of the invention to provide a control system which avoids the use of draft force sensing pins.

In accordance with the invention there is provided a control system for a tractor having a transmission with a hydraulic drive circuit in which a hydraulic pump supplies pressurised fluid to a hydraulic motor, wherein said control system controls an operating condition of an implement attached to the tractor and said control system comprises a pressure sensing means which senses the pressure in the hydraulic drive circuit and provides a signal which is indicative of the current pull force necessary to pull the implement, the system further comprising a control means which receives the pressure signal and a second signal relating to the speed of the tractor and adjusts the current position of the implement to a new position when said pressure signal varies, characterised in that the new position lies within a pre-determined position range dependent on the second signal in order to maintain an optimal, yet safe operating condition of the implement.

By limiting the vertical displacement of the linkage, even though the draft force is changing, the control system prevents damage to the implement, or the tractor.

The higher the speed of the tractor, the narrower the pre-determined position range is. This thus improves safety at higher speeds.

Preferably, the pre-determined position range is effected when attachment of the implement is detected.

Preferably, the new position of the implement is effected by controlling movement of a linkage to which the implement is attached.

More preferably, the linkage is a three point linkage.

For linkage mounted implements, a control system can control the position of an implement attachment linkage relative to the tractor via an actuator means which raises and lowers the implement linkage relative to the tractor. Such a control system can be used to control a linkage which is attached to the rear and/or front of the tractor. No additional draft force sensors are involved as the variation of the pull force of the linkage is determined from the variation in the hydraulic drive circuit pressure. Also the need to use existing pin sensors is avoided.

BRIEF DESCRIPTION OF THE DRAWINGS

The present invention will now be described, by way of example only, with reference to the accompanying drawings in which:—

DETAILED DESCRIPTION OF EXEMPLARY EMBODIMENTS

Figure 1:
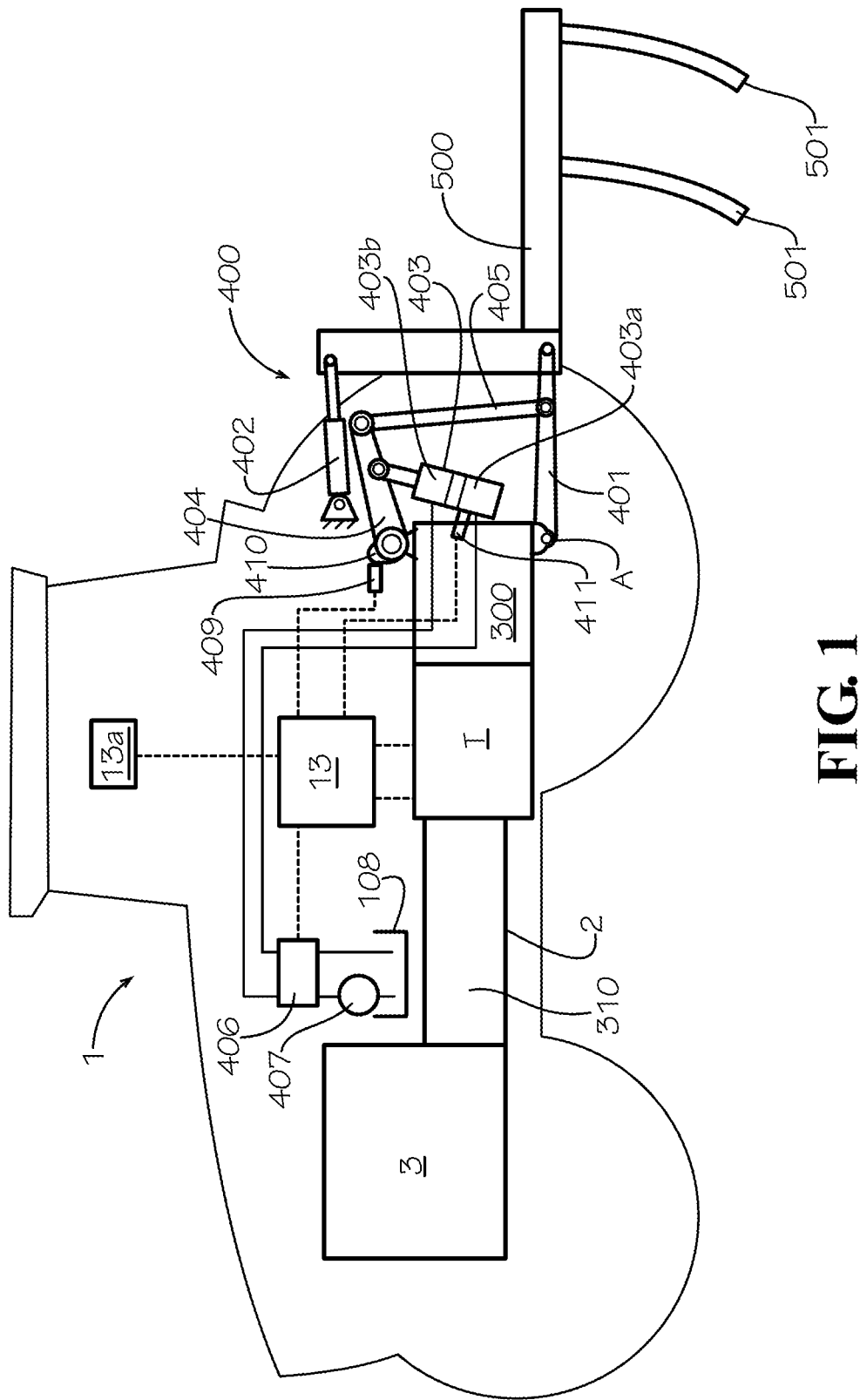
FIG. 1 diagrammatically shows a side view of a tractor with a linkage control system embodying the present invention, FIG. 2 diagrammatically shows a driveline of a tractor with a hydrostatic mechanical CVT and having a linkage control system embodying the present invention, FIG. 3 diagrammatically shows in more detail the hydrostatic mechanical CVT portion of the driveline of FIG. 2.

Referring to the drawings, an agricultural tractor 1 has a driveline 2 having a combustion engine 3, a flywheel 4, a continuously variable transmission, or CVT, T of the hydrostatic-mechanical split type and a rear axle housing 300. Combustion engine 3 is connected to the CVT, T by chassis part 310.

A three-point linkage 400 is attached to the rear axle housing 300 and mainly consists of two lower lifting arms 401 to which an implement is attached. A plough 500 with ground engaging means 501 is attached to lower lifting arms 401. An additional top link 402 connects the implement 500 to the tractor 1. The top link 402 is of a hydraulic type adjustable in length to adjust the inclination of the plough 500 with the ground. The lower lifting arms 401 can be pivoted about axis A by respective hydraulic actuating cylinders 403 which move rocker arm 404 and lift rod 405. The height of the lifting arms can thus be changed by pivoting the lifting arms about axis A and this movement is hereafter referred to as the vertical displacement of the lifting arms. The hydraulic actuating cylinders 403 are supplied with an actuating fluid by a control valve 406. Control valve 204 controls which chamber 403a (to lift the implement) or chamber 403b (to lower the implement) of the hydraulic actuating cylinders 403 is charged with fluid. Control valve 406 is connected to a pump 407 which is driven by combustion engine 3 and connected with a fluid tank 408.

The position of the lower lift arms 401 is indirectly measured by a position sensor 409 which senses the position of a cam 410 attached to rocker arm 404.

An additional pressure sensor 411 is provided to measure the fluid pressure in the chamber 403a of the hydraulic actuating cylinders 403. The fluid in chamber 403a is compressed when the implement weight is fully taken up by the three-point linkage 400 and therefore a pressure increase indicates movement of the implement to a high position for transportation.

A tractor control unit 13 is provided to control various functions of the vehicle. The control unit 13 is electronically connected to various components via CAN-BUS, for example, the transmission and display and input devices. The control unit 13 also contains software to drive the electronic linkage control system. The control unit 13 is connected to an input and display device 13a in the tractor cab to receive input from the operator and to show information to the operator.

Position sensor 409, control valve 406 and pressure sensor 411 are connected to the control unit 13.

Figure 2:
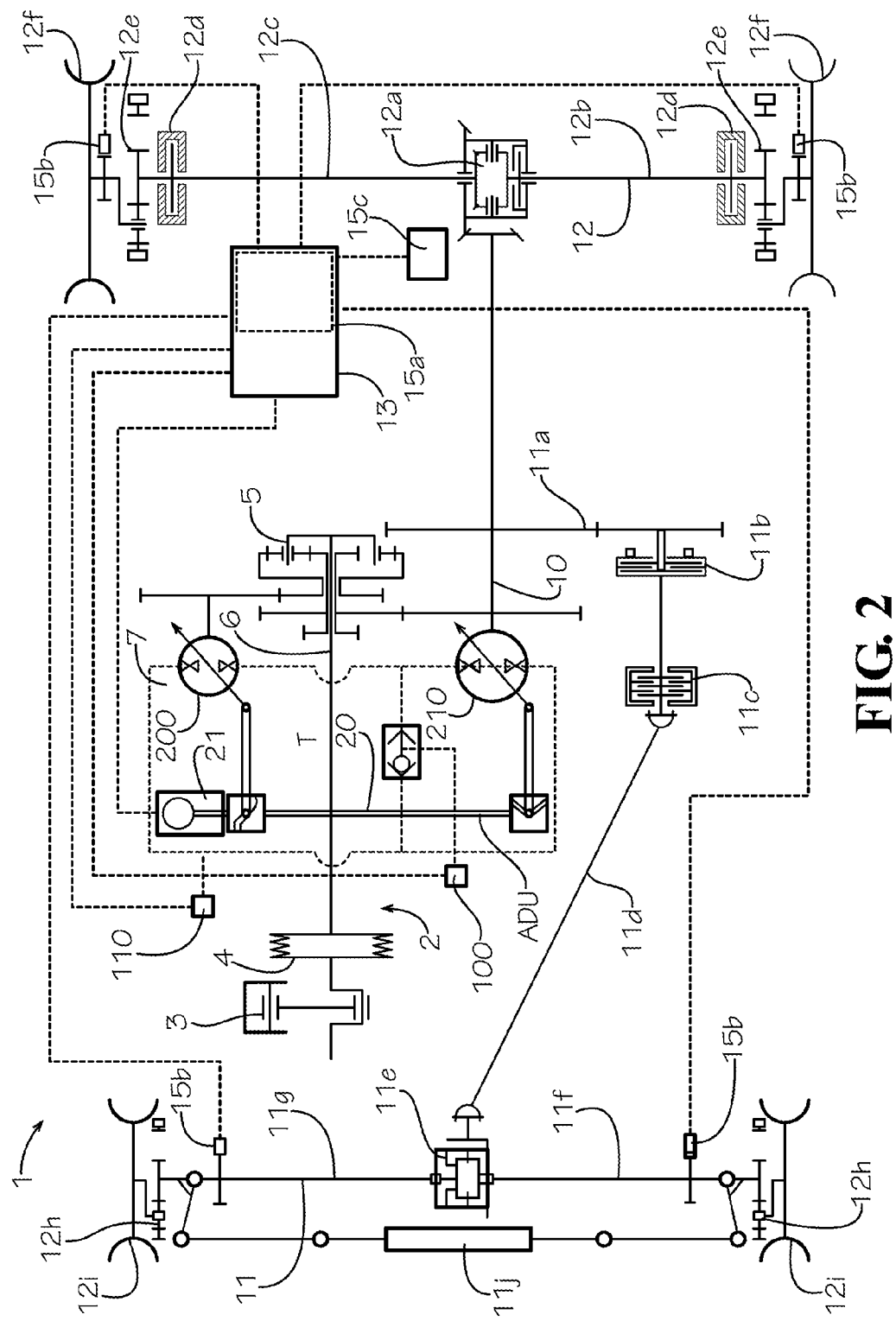

FIG. 2 shows the driveline 2 of the tractor 1 in more detail. The torque supplied by combustion engine 3 via a flywheel 4 is distributed to a mechanical branch 6 and a hydrostatic branch 7 of the transmission T via a planetary drive 5. The hydrostatic branch 7 mainly consists of hydrostats 200, 210, wherein hereafter the hydrostat 200 is designated as the hydraulic pump 200 and the hydrostat 210 as the hydraulic motor 210. Both hydraulic pump 200 and hydraulic motor 210 can be pivoted by an adjustment unit, also referred to as an ADU to change delivery/intake volume as described in FIG. 3.

Both the mechanical branch 6 and the hydrostatic branch 7 of the transmission are driven and brought together on a CVT output shaft 10 at the end of CVT, T. The CVT output shaft 10 delivers an output torque to the respective driveline front and rear axles 11 and 12.

CVT output shaft 10 drives a rear axle differential 12a splitting the torque to a left rear axle portion 12b and a right rear axle portion 12c. Both rear axle portions 12b, 12c are provided with brakes 12d, final reduction gears 12e and wheels 12f.

CVT output shaft 10 also drives a front axle drive gear pair 11a followed by a front wheel drive clutch 11b to disengage and engage front axle driveline. In addition a front brake 11c is provided which is connected to a cardan shaft 11d which ends in a front axle differential 11e splitting the torque to a left front axle portion 11f and a right front axle portion 11g. Both front axle portions 11f, 11g are provided with final reduction gears 12h and wheels 12i. Wheels 12i are steerable about a substantially vertical axis using a hydraulic steering cylinder 11j mounted on the front axle.

The driveline 2 is also equipped with an anti-skid system 15 which mainly consists of an anti-skid control unit 15a integrated in the tractor control unit 13 of the tractor 1, speed sensors 15b for each wheel 11i, 12f and a further anti-skid sensor 15c. The anti-skid sensor 15c provides parameters to control the brake function, for example acceleration in various axes, or inclinations of the vehicle. Anti-skid control unit 15a may be separate from tractor control unit 13.

Alternatively, a GPS system may also deliver parameters such as the acceleration or the inclination of the vehicle.

Figure 3:
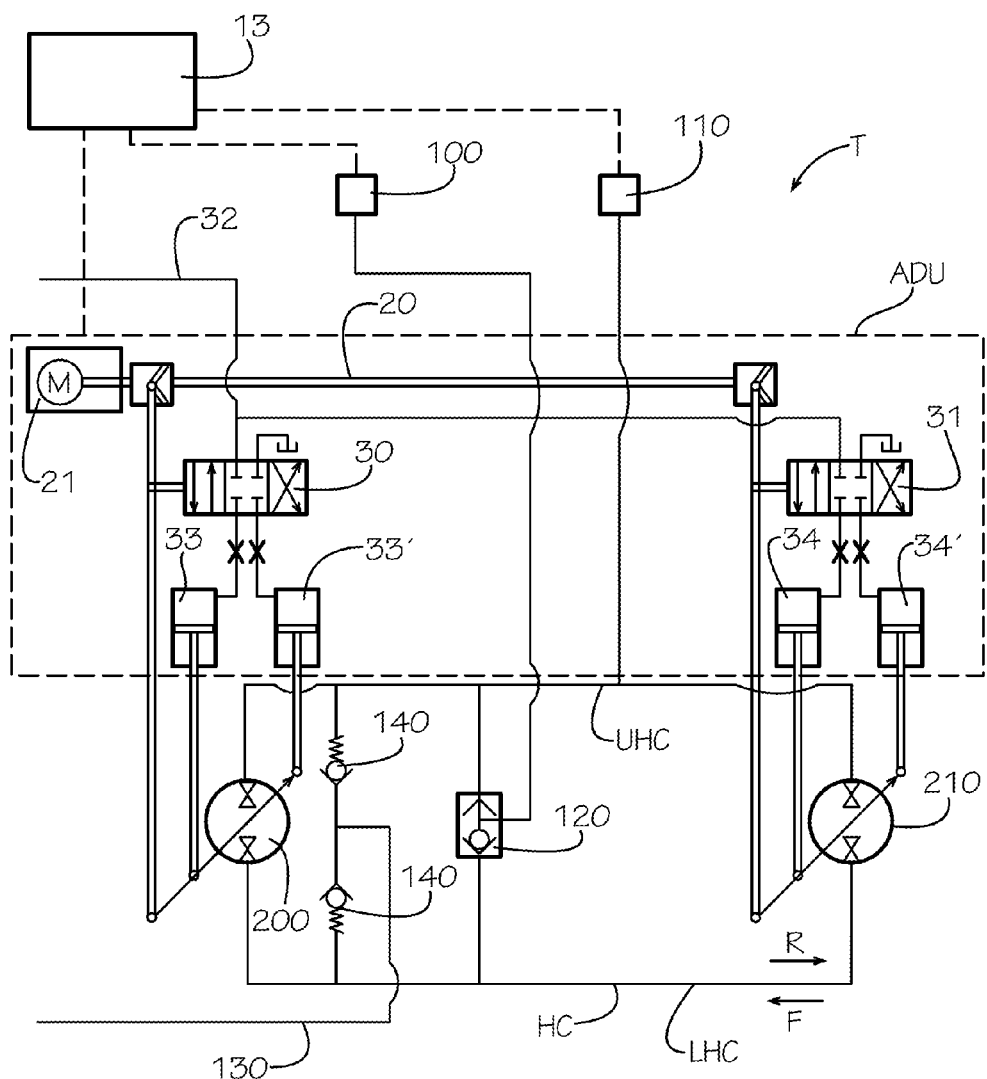

FIG. 3 shows a diagrammatic sketch of the hydrostatic mechanical split type transmission T having an adjustment unit ADU defined by the broken line. The components outside the broken line belong to the power unit of the transmission.

The hydrostats 200, 210 illustrated in FIGS. 2 and 3 are an axial piston pump and an axial piston motor of an oblique-axis design, in which the delivery/intake volume is changed by the pivoting of the axis of rotation of the pistons to an axle drive shaft, not shown.

By means of a first valve unit 30 allocated to hydraulic pump 200 and by means of a second valve unit 31 allocated to the hydraulic motor 210, the individual pivot angle of the hydraulic pump 200 and/or of the hydraulic motor 210 can be adjusted.

Depending on the specified revolution speed transmission ratio iT set by the operator via control unit 13 an actuator element 20 is rotated by means of an actuator motor 21. The actuator motor 21 is in this case controlled by the control unit 13. Because the valve units 30, 31 are coupled to the actuator element 20, these valve units 30, 31 are displaced corresponding to the actuator element 20. As a result, oil present in a line 32 can flow into a cylinder 33, 33', 34, 34' allocated to the valve unit 30, 31.

Due to the displacement of the actuator element 20, the oil flow is accordingly directed out of line 32 and into the cylinders 33, 33', 34, 34'. Thereby the pivot angle of the hydraulic pump 200 and of the hydraulic motor 210 is adjusted. The pivot angle, and therefore the delivery volume of the hydraulic pump 200 and the intake volume of the hydraulic motor 210 can be changed accordingly. This makes it possible for the revolution speed of the axle drive shaft (not shown in FIGS. 2 and 3) to be adjusted, and with it the revolution speed transmission ratio of the transmission T.

The hydraulic pump 200 is connected by fluid circuit HC to the hydraulic motor 210. The fluid circuit HC in has an upper circuit UHC and a lower circuit LHC. The direction of the arrow F represents a flow direction of the fluid located inside the hydraulic circuit HC during forwards travel of the tractor and the direction of the arrow R represents a flow direction of the fluid during reverse travel of the tractor.

By means of a first measuring unit 110, the pressure value pUHC prevailing in the upper circuit UHC can be measured. This pressure value pUHC is then sent to the control unit 13 represented in FIG. 1. Moreover, both the pressure in the upper circuit UHC as well as the pressure in the lower circuit LHC is conducted by means of a shuttle valve 120 to a second measuring unit 100 in order to measure the pressure value pHCmax. This pressure value pHCmax is also sent to the control unit 13.

The shuttle valve in the transmission T is designed in such a way so as to communicate to the second measuring unit 100 the greater of the two pressures present in the upper circuit UHC or the lower circuit LHC as a pressure value pHCmax. When the tractor is stationary, the second measuring unit 100 issues a system pressure of the upper circuit UHC or the lower circuit LHC as pressure value pHCmax. A rotation sensor, not visible in FIG. 2, is arranged at the hydraulic motor 210 with which the direction of the rotation of the hydraulic motor 210 is determined and the direction of travel of the vehicle can be concluded.

When the vehicle is stationary a system pressure of about 15 bar is set in the fluid circuit HC. This system pressure of 15 bar results from the fact that, by means of a supply line 130, the fluid circuit HC is supplied with a constant system pressure by means of a constant hydraulic pump, not shown, driven by the combustion engine. Two check valves 140 prevent oil from flowing back into the supply line. As soon as the utility vehicle moves or the transmission is no longer stationary, the pressure inside the fluid circuit rises, depending on the drive torque, to a high-pressure value of over 15 bar. With an average loading of the transmission, a high-pressure value of between 250-350 bar is provided. A limit of 500 bar must not be exceeded to avoid over stressing of the transmission and its components.

Pressure pHCmax, transmission ratio iT, or the pivot angle of the hydraulic motor 210, or alternatively the intake volume V of the hydraulic motor 210 represent parameters which determine the output torque Mhydr of the hydraulic branch 7. As the transmission ratio iT is known, the pivot angle and intake volume parameters of the hydraulic motor 210 are can be determined by look-up tables or characteristic maps.

As described in relation to FIG. 1, the torque supplied by combustion engine 3 is distributed to a mechanical branch 6 and a hydrostatic branch 7 of the hydrostatic mechanical split type transmission T in which the fraction of torque transmitted by both branches depends on the transmission ratio iT. So if the fraction of the hydrostatic branch 7 is determined as described above, the fraction Mmech transmitted by the mechanical branch 6 can also be determined depending on the current transmission ratio iT.

The overall output torque MOT of the transmission can then be calculated from $$MOT = Mhydr + Mmech = \frac{pHC\mathrm{max} * V}{2\pi} + Mmech \qquad \text{(Equation 1)}$$

The pressure pHCmax is measured as described above and the intake volume V of the hydraulic motor 210 is determined by characteristic maps depending on the transmission ratio iT.

The output torque MOT of the transmission is supplied to the wheels resulting in a wheel torque MW:

$$MW = MOT * iTW \qquad \text{(Equation 2)}$$

In this equation iTW represents the overall gear ratio between the transmission and wheel and is the product of the gear ratio of the rear axle differential 12a and the final reduction gears 12e in rear wheel mode, for example:

ITW=9.2(for the rear axle differential 12a)×3.58(for the final reduction gears 12e)=32.97 overall.

Figure 4:
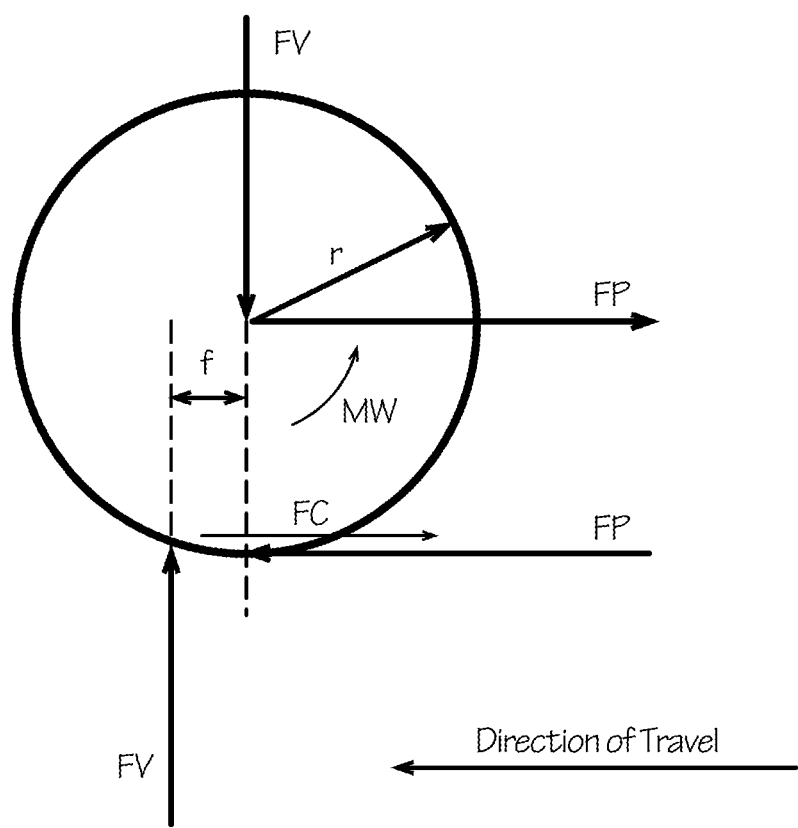
FIG. 4 shows the forces acting between a tractor wheel and the ground.

Knowing the wheel torque MW, the pull force FP can be calculated by using the known relationship of the forces on a wheel as shown in the diagram in FIG. 4.

$$MW=FP*r+FV*f=FC*r \quad \text{(Equation 3)}$$

In which:
r represents the effective wheel radius depending on tyre pressure and wheel size provided by the wheel manufacturer in respective tables
f represents the offset of the point of application of the wheel vertical force (see FIG. 4) caused by roll resistance and sinking of the wheels The circumferential force FC is a theoretical value achieved by converting equation (3):

$$FC = \frac{MW}{r} = FP + FV * \frac{f}{r} \quad \text{(Equation 4)}$$

As the linkage control only needs an indication of an increase in pull force FP, FV (which remains constant) can be ignored and so the equation can be simplified to:

$$\frac{MW}{r} = FP \quad \text{(Simplified Eq. 4)}$$

Thus an increase of the pull force ΔFP would result in an increase of the torque demand ΔMW and therefore an increase of pHCmax.

As pHCmax is constantly measured in the system, this parameter can be used to control the linkage based on an increased draft force applied by the implement.

So by monitoring pHCmax which is already done for transmission control and protection purposes, an increase or decrease of the draft or pull force can be detected and processed in the electronic linkage control system to provide functions like draft control and intermix position/draft control.

The change in drag force is fed into a tractor control unit which is programmed to higher, or lower the linkage in response to the change as programmed. In accordance with the invention, the vertical displacement of the linkage is limited.

This limit prevents the implement or tractor being damaged unnecessarily by a downwards or upwards movement of the linkage in response to a change in drag force.

There are four cases where the movement of the linkage in response to a change in drag force may cause problems when in drag mode. In each case, the implement is in an operating condition be it attached to a ball hitch and not the linkage, or stowed for transportation, or attached for operation without contacting the ground, or semi mounted or fully mounted. The term implement covers all tools, attachments and equipment which can be attached to a tractor including the following which is not an exhaustive list: ploughs, tow bars, sprayers, mowers, drills and planters.

In the case where an implement is attached to a ball hitch and not the linkage, or a trailer is connected by a tow bar to the tractor. A decrease in drag force may result in the linkage being highered which may cause the linkage to collide with the wheels of the tractor or the tow bar which is dangerous. Similarly, if an increase in drag force is detected, for example if a tractor is travelling uphill, the linkage may be lowered which may result in an attached tow bar colliding with the tractor wheels.

So, in a first step, an implement is detected (for example, via the electric supply/light connector). Alternatively fluid couplings may be used to detect the attachment of an implement. But this connector does not provide information as to where the implement is attached (that is whether it is attached to the linkage or to the ball hitch).

Moreover, the pressure in the lifting cylinders cannot always be used to detect whether an implement is not attached or semi mounted to the linkage.

For example, an unloaded linkage may result in the lifting cylinders indicating a pressure of 11 bar which represents a mass of the linkage as being around 600 kg. When a plough is mounted to the linkage and engages the ground (semi mounted) the pressure may change to about 15 bar as the ground supports some of the weight of the plough. On the headland, when fully lifting the plough from the ground for rotation, the pressure may increase to about 45 bar. The difference in pressure between the implement being semi mounted and an unloaded linkage is small: 4 bar+/−a tolerance of 1 to 2 bar which is difficult to detect. This may result in that the condition of a plough being semi mounted is not detectable by the system and as a result the drag mode will remain in an active mode because the pressure limit has not been reached. If this happens, then the linkage may be moved to its highest or lowest position in response to the drag force which can have serious ramifications if an implement, such as a plough is attached. If the pressure limit is set too high by the operator, the drag mode is deactivated while an implement is attached.

Therefore, in accordance with the invention the vertical displacement of the linkage is limited in the drag mode when an implement is attached to a ball hitch of the tractor and not the linkage, or when a tow bar is attached to the tractor to avoid the implement or tow bar being dropped to the ground, or raised high unexpectedly.

In the case where an implement is stowed for transportation in a fully lifted position. In this situation the implement is held high in a stowed position for transportation on the road. Using the cylinder pressure to detect the lifted position is not suitable. As described above, the pressure of the lifting cylinders of a lifted linkage can be too similar to the cylinder pressures when the implement is engaging the ground. It is therefore difficult to safely distinguish between these two different situations.

Therefore, in accordance with the invention the vertical displacement of the linkage is limited when an implement is being transported to avoid the case of an implement being dropped onto the road.

In the case where an implement is not contacting the ground during operation, for example an attached spreader. If the operator forgets to deactivate the drag mode, the sprayer may be lowered or highered unintentionally when a change in drag is sensed. Again, if vertical displacement of the linkage is limited in response to a change in drag force, the damage to an attached implement which does not contact the ground during normal operation is avoided or limited.

In the case where an implement is fully mounted, semi mounted, stowed for transportation or attached for operating above the ground, the risk of damage caused by an unintentional movement of the linkage is greater the faster the tractor is travelling. Accordingly, the range of the vertical displacement of the linkage is limited in relation to the speed of the tractor. The higher the speed of travel of the tractor, the narrower the vertical displacement range of the linkage. For example, if the tractor is travelling between 0-10 km/hr, the linkage may have a limited range of movement of 20 cm. If the speed is between 11-20 km/hr, the range of movement of the linkage may be limited to 10 cm, thus reducing the risk.

The linkage may also be equipped with means to detect if an implement is attached thereto, for example a sensor in the attachment hooks of the lower links 401. The range of vertical displacement of the linkage can be limited accordingly as described in the above situations.

In accordance with the invention, the vertical displacement of the linkage is limited for the drag mode by pre-determined settings defined by the linkage or tractor manufacturer or by the operator.

As the difference of the pull force FP cannot be used as a control parameter for damping the implement linkage when the linkage is stowed high in a position for transportation, the pressure sensor 411 is provided to measure the fluid pressure in the chamber 403a of the hydraulic actuating cylinders 403. A variation of the measured pressure signal from sensor 411 indicates that the implement is oscillating which can also result in the weight on the front axle varying which can cause the tractor to oscillate which impacts on the steering and stability of the tractor. So the signal from pressure sensor 411 is forwarded to the control unit 13 to adjust the damping characteristics of the implement lifting circuit. The damping characteristics can then be adjusted by the linkage control system by adjusting the control valve 406 to reduce oscillation by allowing the implement to move relative to the tractor and thus increase driving steerability and stability.

As described previously, there are different modes of linkage operation: Position control mode, Draft Control mode and Position/Draft intermix mode in which the height of the linkage is continually supported by the tractor. But the linkage can also be set to a "float position" mode in which implements, such as seed drills, which have a ground contacting wheel or wheels can follow the ground contours with part of the weight of the implement supported by the implement wheel or wheels) and part of the weight supported by the linkage as the implement is drawn along behind the tractor.

Alternatively, the damping may be adjusted by means of wheel load sensors which indicate the variation in wheel load which is symptomatic of tractor oscillation. These wheel load sensors may be pressure sensors measuring pressure variations in the suspension cylinder of the front axle, or strain gauges in the rigid rear axle housing.

Although the foregoing examples have concentrated on linkage control systems, as indicated previously the invention is not so limited, being applicable to any tractor control system for the controlled operation of an implement where a draft force measurement is required.

The invention claimed is:

1. A control system for a tractor having a transmission with a hydraulic drive circuit in which a hydraulic pump supplies pressurised fluid to a hydraulic motor, wherein said control system controls an operating condition of an implement attached to the tractor, wherein said control system comprises:
   a pressure sensing device which senses the pressure in the hydraulic drive circuit and provides a signal which is indicative of the current pull force necessary to pull the implement; and
   a control unit which receives the pressure signal and a second signal relating to the speed of the tractor and adjusts the current position of the implement to a new position when said pressure signal varies, characterized in that the new position lies within a pre-determined position range dependent on the second signal in order to limit the vertical displacement of the implement under changing operating conditions.

2. The control system as claimed in claim 1 wherein the higher the speed of the tractor, the narrower the pre-determined position range is.

3. The control system as claimed in claim 1 wherein the pre-determined position range is effected when attachment of the implement is detected.

4. The control system as claimed in claim 1 wherein the new position of the implement is effected by controlling movement of a linkage to which the implement is attached.

5. The control system as claimed in claim 4 wherein the linkage is a three point linkage.

* * * * *